(12) United States Patent
Choi et al.

(10) Patent No.: US 9,426,264 B2
(45) Date of Patent: Aug. 23, 2016

(54) WINDOW, FABRICATING METHOD THEREOF AND MOBILE TERMINAL HAVING THE SAME

(75) Inventors: Hangjune Choi, Seoul (KR); Jongyeon Shin, Bucheon (KR); Seokyong Park, Ansan (KR)

(73) Assignee: LG Electronics Inc., Seoul (KR)

( * ) Notice: Subject to any disclaimer, the term of this patent is extended or adjusted under 35 U.S.C. 154(b) by 371 days.

(21) Appl. No.: 13/292,657

(22) Filed: Nov. 9, 2011

(65) Prior Publication Data

US 2012/0162106 A1  Jun. 28, 2012

(30) Foreign Application Priority Data

Dec. 28, 2010  (KR) .................. 10-2010-0137138

(51) Int. Cl.
| | |
|---|---|
| *H04M 1/02* | (2006.01) |
| *G06F 1/16* | (2006.01) |
| *G06F 3/041* | (2006.01) |
| *G06F 3/044* | (2006.01) |

(52) U.S. Cl.
CPC ........... *H04M 1/0266* (2013.01); *G06F 1/1626* (2013.01); *G06F 1/1637* (2013.01); *G06F 3/041* (2013.01); *G06F 3/044* (2013.01)

(58) Field of Classification Search
CPC ............ G09G 3/2003; G09G 2320/02; G09G 2320/0242
See application file for complete search history.

(56) References Cited

U.S. PATENT DOCUMENTS

| | | | | |
|---|---|---|---|---|
| 2002/0015013 A1* | 2/2002 | Ragle | ................... | H01L 27/156 345/82 |
| 2004/0027525 A1* | 2/2004 | Itakura | ................ | G02F 1/134363 349/141 |
| 2005/0286008 A1 | 12/2005 | Miyagawa et al. | | |
| 2007/0176563 A1* | 8/2007 | Kim | ..................... | H01L 51/5246 315/169.3 |
| 2008/0224968 A1* | 9/2008 | Kashiwabara | ....... | G09G 3/2003 345/83 |
| 2010/0164870 A1* | 7/2010 | Kunthady | ............ | H01H 13/704 345/168 |
| 2010/0273530 A1 | 10/2010 | Jarvis et al. | | |
| 2011/0025647 A1* | 2/2011 | Park | ....................... | G02B 5/208 345/175 |
| 2011/0205179 A1* | 8/2011 | Braun | .................... | G06F 1/169 345/174 |
| 2011/0273375 A1* | 11/2011 | Wilford | ............... | H03K 17/962 345/173 |

FOREIGN PATENT DOCUMENTS

| | | |
|---|---|---|
| CN | 1725069 A | 1/2006 |
| CN | 1725069 A | 1/2006 |
| CN | 101167259 A | 4/2008 |
| CN | 101167259 A | 4/2008 |
| TW | 200604916 A | 2/2006 |
| WO | WO 2006/118408 | 11/2006 |

OTHER PUBLICATIONS

European Search Report dated Mar. 30, 2012 for Application 11008833.3.
Chinese Office Action issued in related Application No. 201110431780.1 dated May 28, 2014.
Taiwanese Office Action issued in Application of 100141087 dated Apr. 14, 2016.

* cited by examiner

*Primary Examiner* — Srilakshmi K Kumar
*Assistant Examiner* — Carl Adams
(74) *Attorney, Agent, or Firm* — KED & Associates LLP

(57) ABSTRACT

A mobile terminal includes a window having an opaque region, which includes a transparent substrate, a first layer formed on one surface of the substrate and having a color, and a second layer formed on one surface of the first layer and configured to reflect light incoming through the first layer and light outgoing from the inside.

13 Claims, 8 Drawing Sheets

WINDOW, FABRICATING METHOD THEREOF AND MOBILE TERMINAL HAVING THE SAME

CROSS-REFERENCE TO RELATED APPLICATION(S)

The present disclosure relates to subject matter contained in priority Korean Application No. 10-2010-0137138, filed on Dec. 28, 2010, which is herein expressly incorporated by reference in its entirety.

BACKGROUND OF THE INVENTION

1. Field of the Invention

This specification relates to a mobile (portable) terminal, and particularly, to a mobile terminal having a window with improved color sensitivity and clearness of a color.

2. Background of the Invention

Terminals may be divided into mobile/portable terminals and stationary terminals according to their mobilities. Also, the portable terminals may be categorized into a handheld terminal and a vehicle mount terminal according to whether it is directly portable by a user.

As it becomes multifunctional, the terminal can be allowed to capture still images or moving images, play music or video files, play games, receive broadcast and the like, so as to be implemented as an integrated multimedia player.

Various attempts have been done for the terminals by hardware or software in order to implement such complicated functions.

Especially, in order to make an appearance of a mobile terminal more attractive, it may be considered to improve color sensitivity and clearness in a color of a painted opaque region of a window.

SUMMARY OF THE INVENTION

Therefore, an aspect of the detailed description is to provide a mobile terminal having an opaque region of a window with improved color sensitivity and clearness of a color, and a fabricating method thereof.

Another aspect of the detailed description is to provide a mobile terminal having various colors meeting user's requirements, and a fabricating method thereof.

To achieve these and other advantages and in accordance with the purpose of this specification, as embodied and broadly described herein, a mobile terminal may include a body to contain electronic components of the mobile terminal, a display provided on the body to provide images, and a window provided on the display, the window including a transparent region and an opaque region, the opaque region to obscure a portion of the display from a viewer of the display, wherein the opaque region of the window may include a transparent substrate, a first layer formed on a surface of the substrate, the first layer having a single color, and a second layer formed on a surface of the first layer, the second layer of the opaque region provided between the first layer and the display, the second layer to reflect incoming light received through the first layer in a direction away from the display, and the second layer to reflect light received from the display in a direction away from the first layer.

The second layer of the opaque region may include a first surface that faces the first layer and a second surface that faces the display. Here, the first surface of the second layer may reflect the incoming light received from the first layer in the direction away from the display, and the second surface of the second layer may reflect the light received from the display in the direction away from the first layer.

The second layer may be formed of a non-conductive material. The second layer may be formed of one of indium, tin, or a combination of silicon oxide and titanium oxide. The second layer may be formed of a material with a high luminance.

The second layer may be formed by one of thermal resistance evaporation, sputtering or Non-Conductive Vacuum Metalizing (NCVM).

An area of the second layer may be at least as wide as an area of the first layer.

The first layer may include a first sub-layer and a second sub-layer. Here, the first sub-layer of the first layer may be provided between the substrate and the second sub-layer, and have a greater width than the second sub-layer.

The first layer may include a hole with a preset shape.

The opaque region of the window may further include a third layer formed under the second layer, and the third layer may adsorb light from the display.

The third layer may be formed with a gray color or a black color.

The opaque region of the window may further include a fourth layer and a fifth layer, and the fourth layer may be provided between the third layer and the fifth layer.

The fourth layer may adhere the substrate, the first layer, the second layer and the third layer onto the fifth layer.

The fourth layer may include an optical adhesive film.

The fifth layer may detect a touch input.

The opaque region may be provided around a circumference of the transparent region.

In accordance with another exemplary embodiment, a mobile terminal may include a wireless communication unit to provide wireless communication, a display to display images, a touch window on the display to receive touch inputs, and a body to support the wireless communication unit, the display and the touch window, wherein the touch window includes a transparent region and an opaque region, wherein the opaque region of the window may include a transparent substrate, a first layer formed under the substrate, and a second layer formed under the first layer such that the first layer is provided between the second layer and the substrate, the second layer including a first surface to face the first layer and a second surface to face away from the first layer, the first surface of the first layer to reflect external light away from the display, and the second surface of the second layer to reflect internal light away from the first layer.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated. Hereinafter, suffixes "module" and "unit or portion" for components used herein in description are merely provided only for facilitation of preparing this specification, and thus they are not granted a specific meaning or function. In describing the present invention, if a detailed explanation for a related known function or construction is considered to unnecessarily divert the gist of the present disclosure, such explanation has been omitted but would be understood by those skilled in the art. The accompanying drawings are used to help easily understood the technical idea of the present invention and it should be understood that the idea of the present disclosure is not limited by the accompanying drawings.

Mobile terminals described in this specification may include cellular phones, smart phones, laptop computers, digital broadcasting terminals, personal digital assistants (PDAs), portable multimedia players (PMPs), E-books, navigators, and the like.

Figure 1:
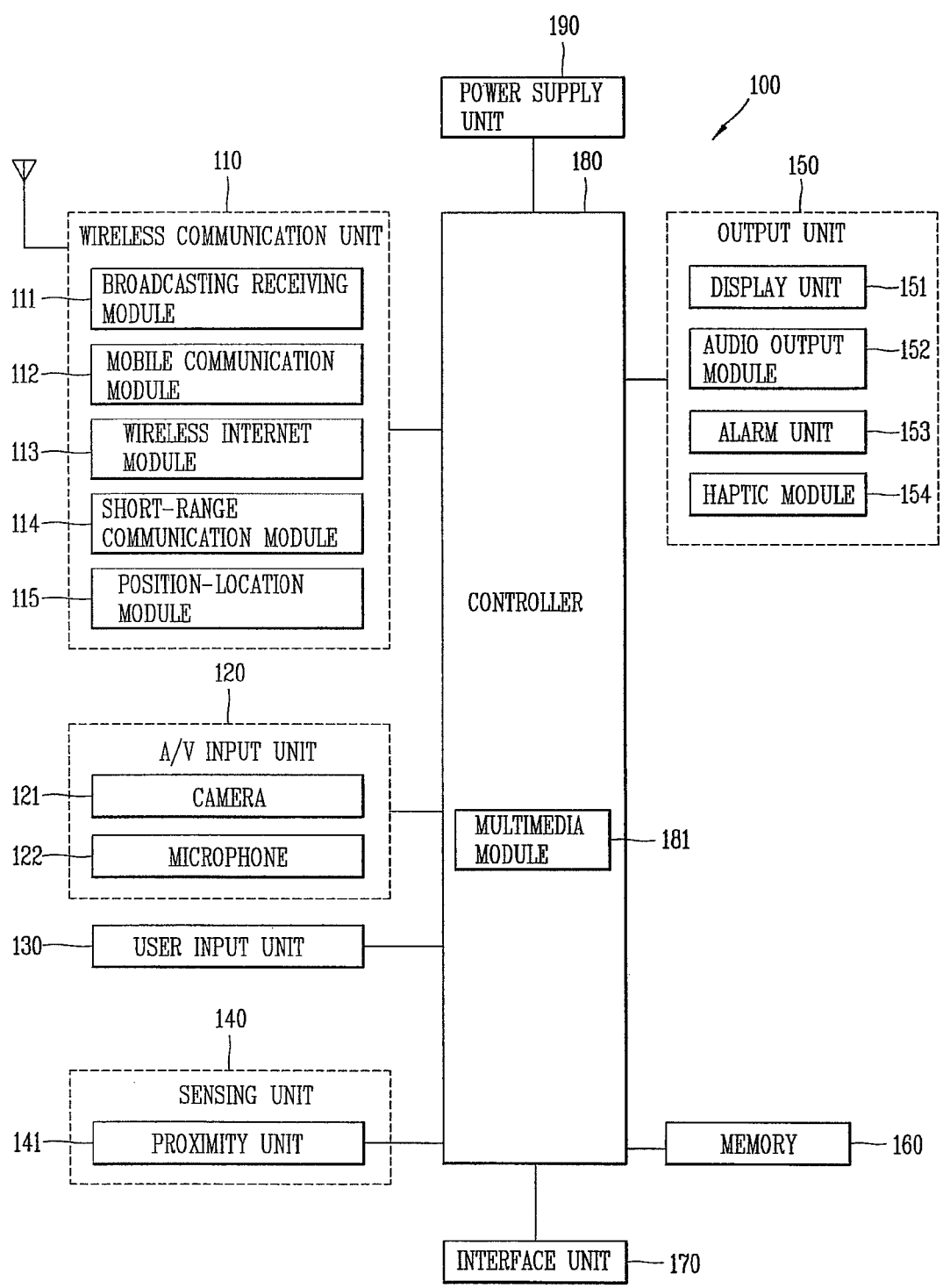
FIG. 1 is a block diagram illustrating a functional configuration of a mobile terminal and an organic control system therebetween in accordance with this specification.

FIG. 1 is a block diagram of a mobile terminal 100 in accordance with one exemplary embodiment.

The mobile terminal 100 may comprise components, such as a wireless communication unit 110, an Audio/Video (NV) input unit 120, a user input unit 130, a sensing unit 140, an output unit 150, a memory 160, an interface unit 170, a controller 180, a power supply 190 and the like. FIG. 1 shows the mobile terminal 100 having various components, but it is understood that implementing all of the illustrated components is not a requirement. Greater or fewer components may alternatively be implemented.

Hereinafter, each component is described in sequence.

The wireless communication unit 110 may typically include one or more modules which permit wireless communications between the mobile terminal 100 and a wireless communication system or between the mobile terminal 100 and a network within which the mobile terminal 100 is located. For example, the wireless communication unit 110 may include a broadcast receiving module 111, a mobile communication module 112, a wireless Internet module 113, a short-range communication module 114, a location information module 115 and the like.

The broadcast receiving module 111 receives a broadcast signal and/or broadcast associated information from an external broadcast managing entity via a broadcast channel.

The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the mobile terminal. The broadcast signal may be implemented as a TV broadcast signal, a radio broadcast signal, and a data broadcast signal, among others. The broadcast signal may further include a data broadcast signal combined with a TV or radio broadcast signal.

Examples of broadcast associated information may include information associated with a broadcast channel, a broadcast program, a broadcast service provider, and the like. The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. The broadcast receiving module 111 may be configured to be suitable for every broadcast system transmitting broadcast signals as well as the digital broadcasting systems.

Broadcast signals and/or broadcast associated information received via the broadcast receiving module 111 may be stored in a suitable device, such as a memory 160.

The mobile communication module 112 transmits/receives wireless signals to/from at least one of network entities (e.g., base station, an external mobile terminal, a server, etc.) on a mobile communication network. Here, the wireless signals may include audio call signal, video (telephony) call signal, or various formats of data according to transmission/reception of text/multimedia messages.

The wireless Internet module 113 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), Worldwide Interoperability for Microwave Access (Wimax), High Speed Downlink Packet Access (HSDPA) and the like.

The short-range communication module 114 denotes a module for short-range communications. Suitable technologies for implementing this module may include BLUETOOTH™, Radio Frequency IDentification (RFID), Infrared Data Association (IrDA), Ultra-WideBand (UWB), ZigBee™, and the like.

The location information module 115 denotes a module for detecting or calculating a position of a mobile terminal. An example of the location information module 115 may include a Global Position System (GPS) module.

Referring to FIG. 1, the A/V input unit 120 is configured to provide audio or video signal input to the mobile terminal. The A/V input unit 120 may include a camera 121 and a microphone 122. The camera 121 receives and processes image frames of still pictures or video obtained by image sensors in a video call mode or a capturing mode. The processed image frames may be displayed on a display unit 151.

The image frames processed by the camera 121 may be stored in the memory 160 or transmitted to the exterior via the wireless communication unit 110. Two or more cameras 121 may be provided according to the configuration of the mobile terminal.

The microphone 122 may receive an external audio signal while the mobile terminal is in a particular mode, such as a phone call mode, a recording mode, a voice recognition mode, or the like. This audio signal is processed into digital data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data input by a user to control the operation of the mobile terminal. The user input unit 130 may include a keypad, a dome switch, a touchpad (e.g., static pressure/capacitance), a jog wheel, a jog switch and the like.

The sensing unit 140 provides status measurements of various aspects of the mobile terminal. For instance, the sensing unit 140 may detect an open/close status of the mobile terminal, a change in a location of the mobile terminal 100, a presence or absence of user contact with the mobile terminal 100, the location of the mobile terminal 100, acceleration/deceleration of the mobile terminal 100, and the like, so as to generate a sensing signal for controlling the operation of the mobile terminal 100. For example, regarding a slide-type mobile terminal, the sensing unit 140 may sense whether a sliding portion of the mobile terminal is open or closed. Other examples include sensing functions, such as the sensing unit 140 sensing the presence or absence of power provided by the power supply 190, the presence or absence of a coupling or other connection between the interface unit 170 and an external device. Meanwhile, the sensing unit 140 may include a proximity sensor 141.

The output unit 150 is configured to output an audio signal, a video signal or a tactile signal. The output unit 150 may include a display unit 151, an audio output module 152, an alarm unit 153 and a haptic module 154.

The display unit 151 may output information processed in the mobile terminal 100. For example, when the mobile terminal is operating in a phone call mode, the display unit 151 will provide a User Interface (UI) or a Graphic User Interface (GUI), which includes information associated with the call. As another example, if the mobile terminal is in a video call mode or a capturing mode, the display unit 151 may additionally or alternatively display images captured and/or received, UI, or GUI.

The display unit 151 may be implemented using, for example, at least one of a Liquid Crystal Display (LCD), a Thin Film Transistor-Liquid Crystal Display (TFT-LCD), an Organic Light-Emitting Diode (OLED), a flexible display, a three-dimensional (3D) display, or the like.

Some of such displays 151 may be implemented as a transparent type or an optical transparent type through which the exterior is visible, which is referred to as 'transparent display'. A representative example of the transparent display may include a Transparent OLED (TOLED), and the like. The rear surface of the display unit 151 may also be implemented to be optically transparent. Under this configuration, a user can view an object positioned at a rear side of a terminal body through a region occupied by the display unit 151 of the terminal body.

The display unit 151 may be implemented in two or more in number according to a configured aspect of the mobile terminal 100. For instance, a plurality of the displays 151 may be arranged on one surface to be spaced apart from or integrated with each other, or may be arranged on different surfaces.

Here, if the display unit 151 and a touch sensitive sensor (referred to as a touch sensor) have a layered structure therebetween, the structure may be referred to as a touch screen. The display unit 151 may be used as an input device rather than an output device. The touch sensor may be implemented as a touch film, a touch sheet, a touchpad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

Still referring to FIG. 1, a proximity sensor 141 may be arranged at an inner region of the mobile terminal 100 covered by the touch screen, or near the touch screen. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to functions performed in the mobile terminal 100, e.g., sound alarming a call received or a message received, and so on. The audio output module 152 may include a receiver, a speaker, a buzzer, and so on.

The alarm unit 153 outputs signals notifying occurrence of events from the mobile terminal 100. The events occurring from the mobile terminal 100 may include call received, message received, key signal input, touch input, and so on. The alarm unit 153 may output not only video or audio signals, but also other types of signals such as signals notifying occurrence of events in a vibration manner. Since the video or audio signals can be output through the display unit 151 or the audio output module 152, the display unit 151 and the audio output module 152 may be categorized into a part of the alarm unit 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the mobile terminal 100.

The memory 160 may store a program for the processing and control of the controller 180. Alternatively, the memory 160 may temporarily store input/output data (e.g., phonebook data, messages, still images, video and the like). Also, the memory 160 may store data related to various patterns of vibrations and audio output upon the touch input on the touch screen.

The memory 160 may be implemented using any type of suitable storage medium including a flash memory type, a hard disk type, a memory card type (e.g., SD or DX memory), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the mobile terminal with external devices. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as 'identification device') may be implemented in a type of smart card. Hence, the identification device can be coupled to the mobile terminal 100 via a port.

Also, the interface unit 170 may serve as a path for power to be supplied from an external cradle to the mobile terminal 100 when the mobile terminal 100 is connected to the external cradle or as a path for transferring various command signals input from the cradle by a user to the mobile terminal 100. Such various command signals or power input from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

The power supply 190 provides power required by various components under the control of the controller 180. The provided power may be internal power, external power, or combination thereof.

Various embodiments described herein may be implemented in a computer-readable medium using, for example, software, hardware, or some combination thereof.

For a hardware implementation, the embodiments described herein may be implemented within one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, microprocessors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

Figure 2:
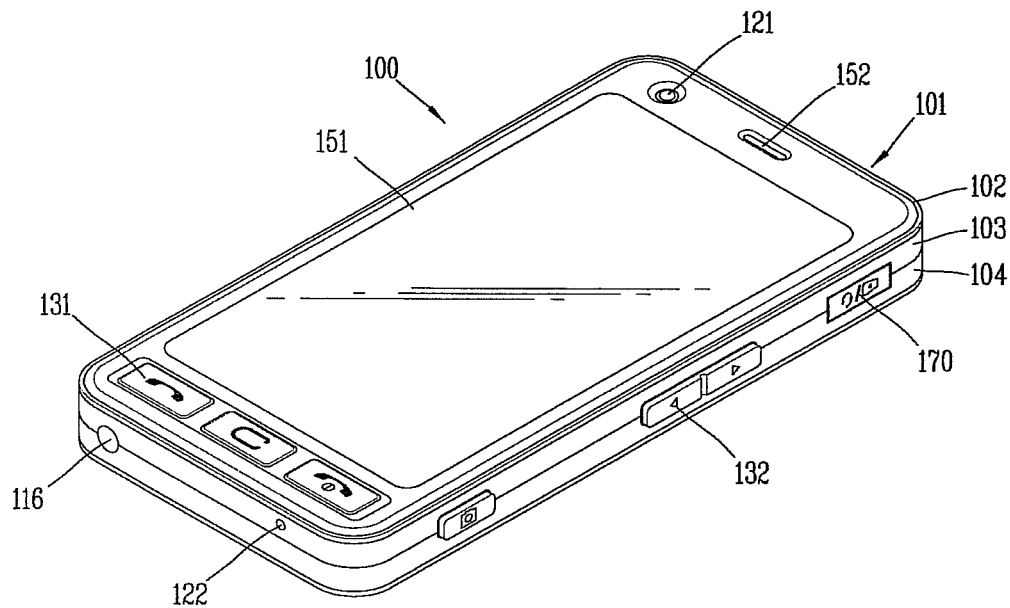
FIG. 2 is a front perspective view of the mobile terminal.

FIG. 2 is a front perspective view of the mobile terminal.

A mobile terminal 100 disclosed herein has a bar type terminal body. Here, the present disclosure may not be limited to the type, but be applicable to various types such as a slide type, a folder type, a swing type, a swivel type and the like, having two or more bodies coupled to be relatively movable with each other.

The body may include a case (casing, housing, cover, etc.) defining an outer appearance. In this exemplary embodiment, the case may be divided into a front case 101 and a rear case 102. Various electronic components may be mounted in a space between the front case 101 and the rear case 102. At least one intermediate case may further be interposed between the front case 101 and the rear case 102.

Such cases may be injected using a synthetic resin or be formed of a metal, such as stainless steel (STS), titanium (Ti) or the like.

The terminal body is shown having a display unit 151, an audio output module 152, a camera 121, a user input unit 130/131, 132, a microphone 122, an interface unit 170, and the like.

The display unit 151 may occupy most of a main surface of the front case 101. The audio output module 152 and the camera 121 may be disposed near one of both end portions of the display unit 151, and the user input unit 131 and the microphone 122 on the other end portion of the display unit 151. The user input unit 132, the interface unit 170 and the like may be disposed on side surfaces of the front and rear cases 101 and 102.

The user input unit 130 may be manipulated to allow inputting of commands for controlling operations of the mobile terminal 100, and include a plurality of first manipulation units 131, 132. The plurality of manipulation units 131, 132 may be referred to as a manipulating portion. Such manipulating portion can employ any tactile manner that a user can touch or tap for manipulation.

The first and second manipulation units 131, 132 may be set to allow inputting of various contents. For example, the first manipulation unit 131 may be configured to input commands such as START, END, SCROLL or the like, and the second manipulation unit 132 may be configured to input commands, such as volume adjustment of sounds output from the audio output module 152, conversion of the display unit 151 into a touch recognition mode, or the like.

Figure 3:
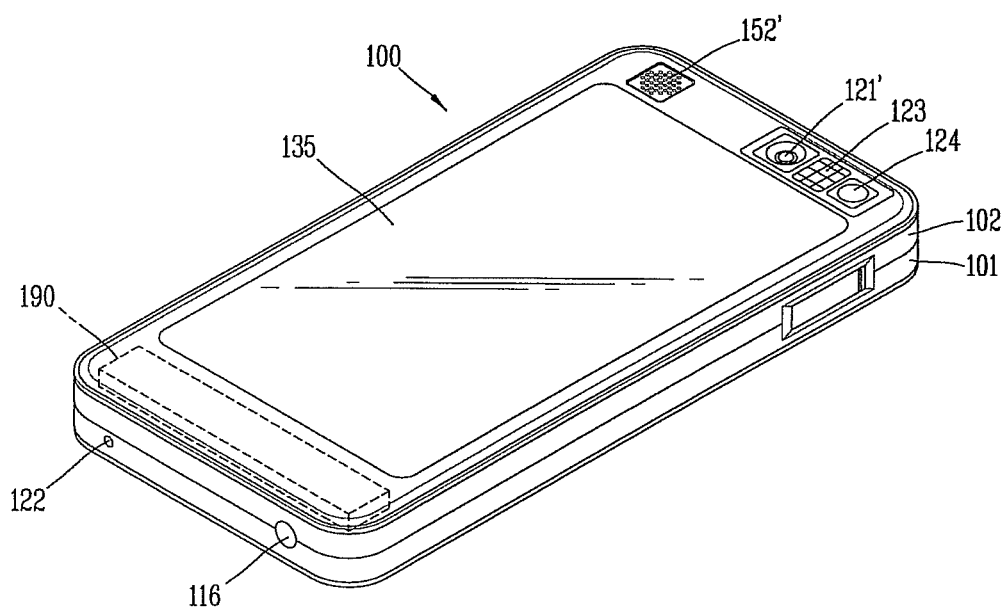
FIG. 3 is a rear perspective view of the mobile terminal.

FIG. 3 is a rear perspective view of the mobile terminal 100 illustrated in FIG. 2.

As illustrated in FIG. 3, a rear face of the terminal body, namely, the rear case 102 may further be provided with a camera 121'. The camera 121' faces a direction which is opposite to a direction faced by the camera 121, and may have different pixels from those of the camera 121.

For example, the camera 121 may operate with relatively lower pixels (lower resolution). Thus, the camera 121 may be useful when a user can capture his face and send it to another party during a video call or the like. On the other hand, the camera 121' may operate with a relatively higher pixels (higher resolution) such that it can be useful for a user to obtain higher quality pictures for later use. The cameras 121 and 121' may be installed in the terminal body to be rotatable or popped up.

A flash 123 and a mirror 124 may additionally be disposed adjacent to the camera 121'. The flash 123 operates in conjunction with the camera 121' when taking a picture using the camera 121'. The mirror 124 can cooperate with the camera 121' to allow a user to photograph himself in a self-portrait mode.

An audio output module 152' may further be disposed at a rear face of the terminal body. The audio output module 152' can cooperate with the audio output module 152 (see FIG. 2) to provide stereo output. Also, the audio output module 152' may be configured to operate as a speakerphone.

A broadcast signal receiving antenna 116 may further be disposed at one side of the terminal body in addition to an antenna for communications, for example. The antenna 116 configuring a part of the broadcast receiving module 111 (see FIG. 1) may be retractable into the terminal body.

A power supply unit 190 for supplying power to the mobile terminal 100 may be mounted in the terminal body. The power supply unit 190 may be mounted in the terminal body or detachably coupled directly onto the outside of the terminal body.

The rear case 102 may be further provided with a touchpad 134 for detecting a touch input. Similar to the display unit 151, the touchpad 135 may be implemented as a light-transmissive type. Here, if the display unit 151 is configured to output visual information from both surfaces, the visual information can be recognized through the touchpad 135. The information output from the both surfaces may all be controlled by the touchpad 135. Unlike to this, a display may further be mounted on the touchpad 135 so as to configure a touch screen even on the rear case 102.

The touchpad 135 may operate cooperative with the display unit 151 of the front case 101. The touchpad 135 may be disposed at a rear side of the display unit 151 in parallel to the display unit 151. The touchpad 135 may have a size the same as or smaller than that of the display unit 151.

Figure 4:
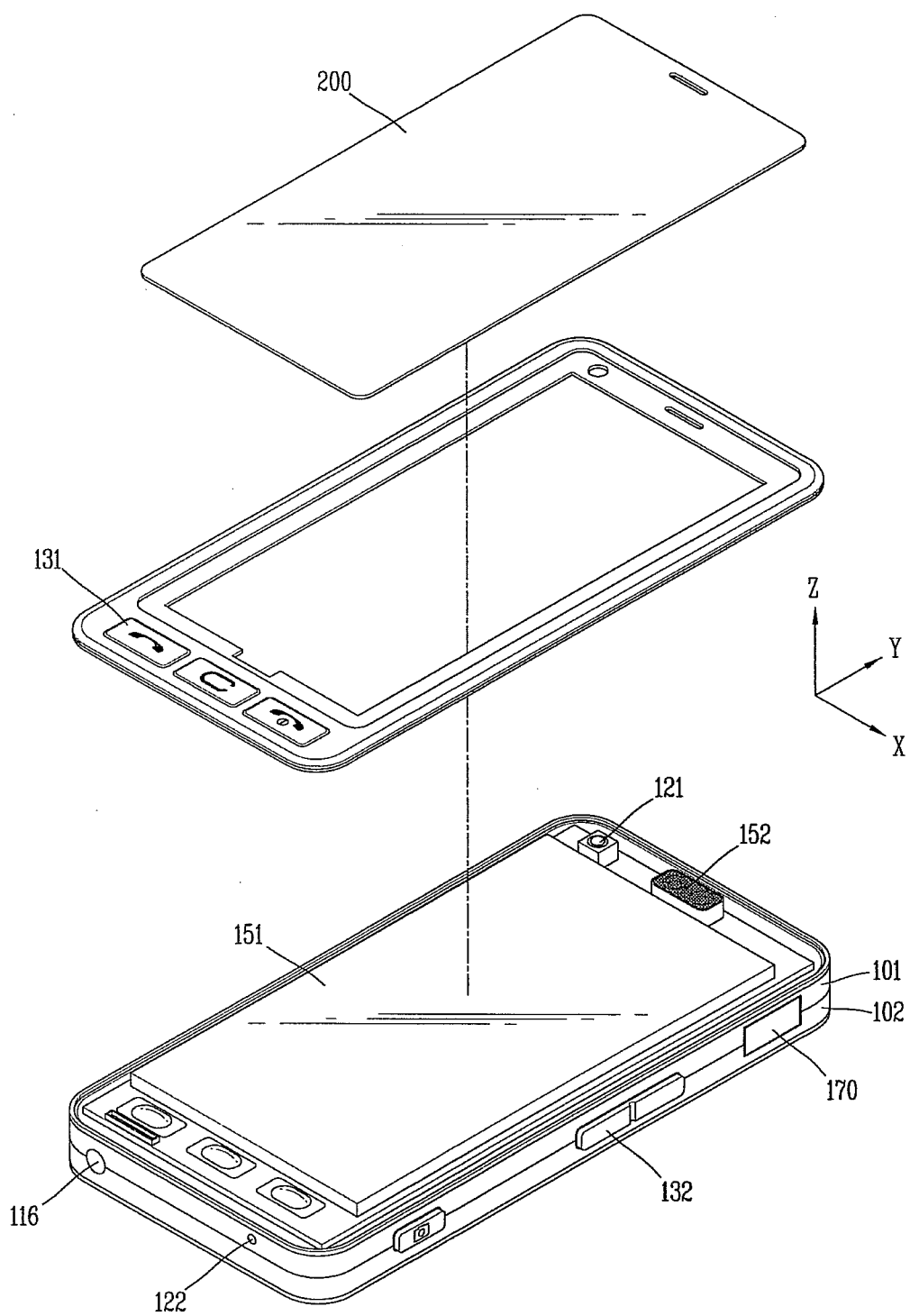
FIG. 4 is a disassembled perspective view of the mobile terminal of FIG. 2.

FIG. 4 is a disassembled perspective view of the mobile terminal of FIG. 2.

As illustrated in FIG. 4, a window 200 may be mounted onto a front surface of the front case 101. The window 200 may be a touch window allowing touch inputs.

Figure 5:
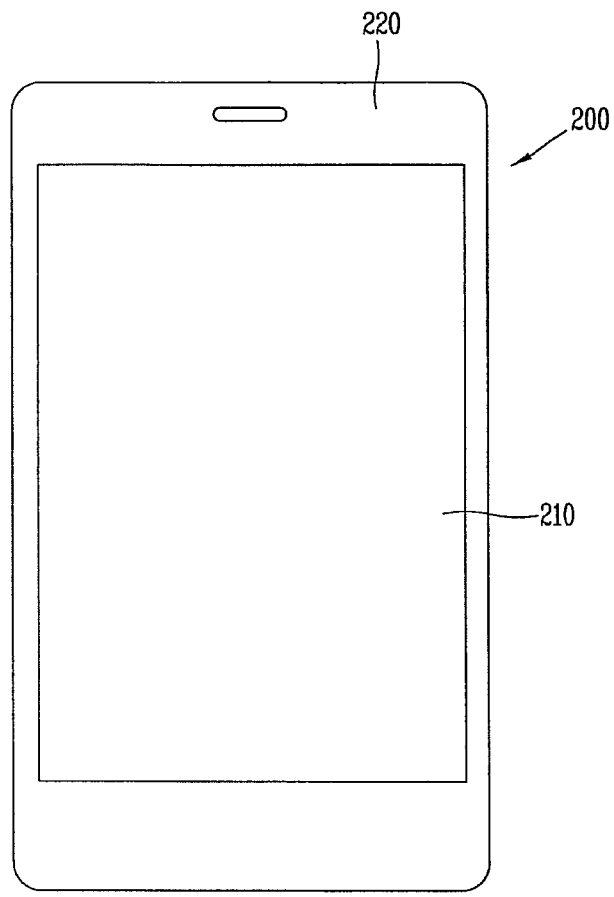
FIG. 5 is a planar view showing a window of FIG. 4.
Figure 6:
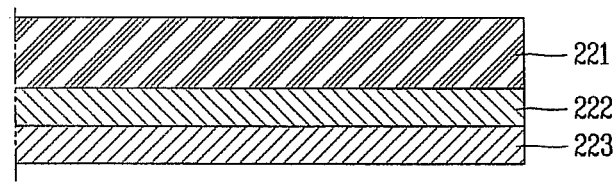
FIGS. 6 to 9 are sectional views illustrating layer architecture of an opaque region of the window.

FIG. 5 is a planar view illustrating the window, and FIGS. 6 to 9 are sectional views illustrating layer architecture of an opaque region of the window.

Referring to FIG. 5, the window 200 may obscure the display unit 151, and include a transparent region 210 and an opaque region 220. The opaque region 220 may include multiple layers. Those layers may be laminated from the top in the order of a substrate 221, a first layer 222 and a second layer 223.

The substrate 221 may be provided to form the first layer 222 and the second layer 223 thereon. The substrate 221 may be formed to be deformed due to touching or an impact as less as possible, and provide sufficient rigidity.

The substrate 221 may be formed of glass, tempered glass, plastic, tempered plastic or the like. Especially, thin thickness and high rigidity can be expected when the substrate 221 is formed of the tempered glass.

The first layer 222 may be printed or adhered onto the opaque region 220 of the substrate 221.

The first layer 222 may have either various colors or a single color. The first layer 222 may be visible by a user through the substrate 221.

Figure 7:
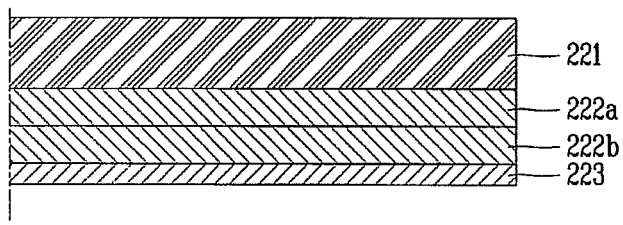
Figure 8:
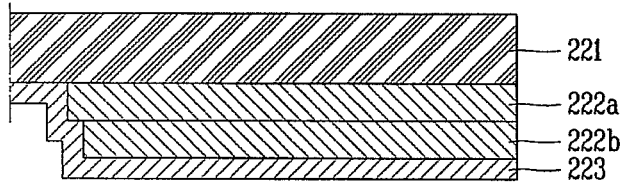

The first layer 222 may be implemented with a single layer, or with a plurality of layers as illustrated in FIGS. 7 and 8.

When the first layer 222 is formed with the plurality of layers, as illustrated in FIG. 8, it may be formed such that a width from the substrate 221 to the second layer 223 can be gradually decreased.

Referring to FIG. 8, an upper first layer 222a may have a wider area than a lower first layer 222b so as to be stepped.

Accordingly, as the lower first layer 222b formed later due to the order of processes is formed to have a smaller area, an occurrence of a case that the lower first layer 222b is formed wider than the upper first layer 222a can be avoided.

The foregoing description illustrates that the first layer 222 is formed on a surface 221. Alternatively, the first layer 222 may be replaced with opaque dye added into the substrate 221.

The second layer 223 may be configured to reflect light transmitted through the first layer 222 and formed by deposition, sputtering or printing.

One surface of the second layer 223 may reflect light transmitted through the first layer 222, and the other surface thereof may reflect light generated from the inside of the mobile terminal 100 to prevent external leakage of such light.

Accordingly, it may be possible for a user to recognize a color defined in the first layer 222 as it is without interference with other colors. When the first layer 222 has a bright color, a better effect can be obtained. Particularly, when the first layer 222 is white, it may be recognized as a pure white color.

When the first layer 222 is formed in a multi-layered structure and gradually tapered in width, the second layer 223 may prevent generation of color deviation or light leakage at the boundary between the multi-layered first layers 222.

Even when each film of the first layer 222 is formed with a different thickness, the generation of color deviation may be prevented.

The second layer 223, for example, may implement an effect like a double-sided mirror. To this end, luminance of the second layer 223 may be important.

As one example, difference of luminance according to materials may be in the order of aluminum>indium>tin>complex of silicon oxide and titanium oxide (SiO2, TiO2).

The second layer 223 may preferably be formed of a non-conductive material. Accordingly, when the second layer 223 is formed on the touch window 200, a touch interference, which may be caused due to use of a conductive material, may be avoided.

Therefore, in regard of the touch window 200, the conductive aluminum may be improper to be used, so one of indium, tin or complex of silicon oxide and titanium oxide may preferably be used to form the second layer 223.

The second layer 223 may preferably be formed by Non-Conductive Vacuum Metalizing (NCVM).

The NCVM refers to metalizing in a non-conductive vacuum state, namely, a metal deposition which has a color of metal and high resistance so as to exhibit a characteristic similar to an insulator.

Hence, upon use of the NCVM, the second layer 223 may exhibit high luminance without conductivity, and be applicable to various types of windows 200 including the touch window 200.

The second layer 223 may preferably have at least an area as wide as that of the first layer 222. This is because it is possible to recognize a color defined on the first layer 222 without color deviation only when the second layer 223 is formed with the area corresponding to the area of the first layer 222.

Figure 9:
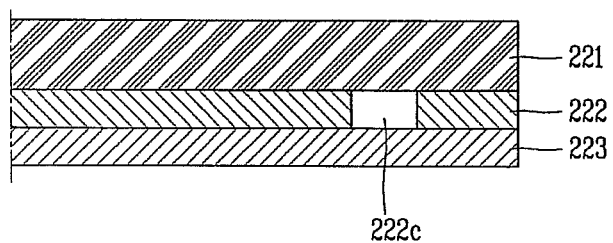
Figure 10:
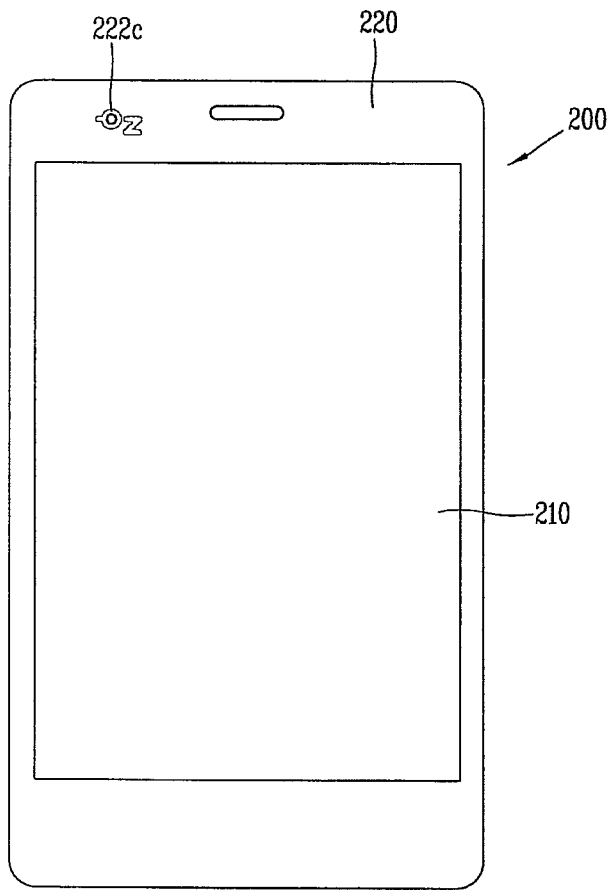
FIG. 10 is a planar view illustrating a structure with a hole formed through a first layer of FIG. 5.

FIG. 9 is a sectional view illustrating a structure having a hole formed through the first layer and FIG. 10 is a planar view of the hole-formed state.

A hole 222c may be formed in a shape of figure, character, logo or the like. Thus, the process of forming such figure, character, logo or the like may be replaced by a reflection effect of the second layer 223 without an additional process like mirror printing or the like.

Figure 11:
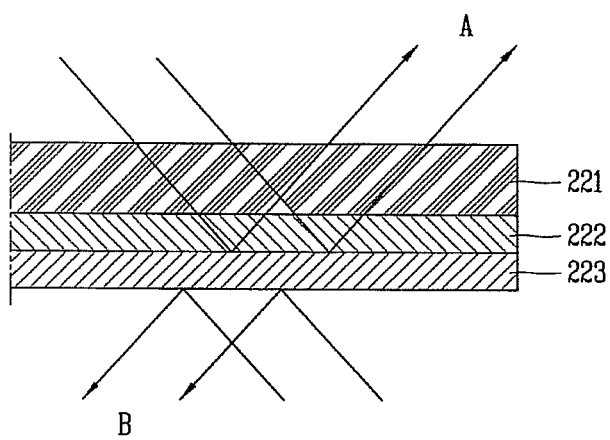
FIG. 11 is an overview illustrating an operation of a second layer of FIG. 5.

FIG. 11 is an overview showing an operation of the second layer.

Light A, which is transmitted through the transparent substrate 221, reaches the second layer 223 through the first layer 222. Here, the second layer 223 is formed of a material with high luminance, so most of light may be reflected.

Accordingly, since any interference with other colors is not observed in view of the path of light, the color defined on the first layer 222 may be recognized as it is, so color deviation from the coupled structure of the cases 101, 102 can not be caused, thereby reducing the burden on designing.

Also, even if light B is generated from an inner light source, the light B is reflected by the second layer 223. Hence, the light B may not be transmitted to the exterior, thereby avoiding light leakage.

Figure 12:
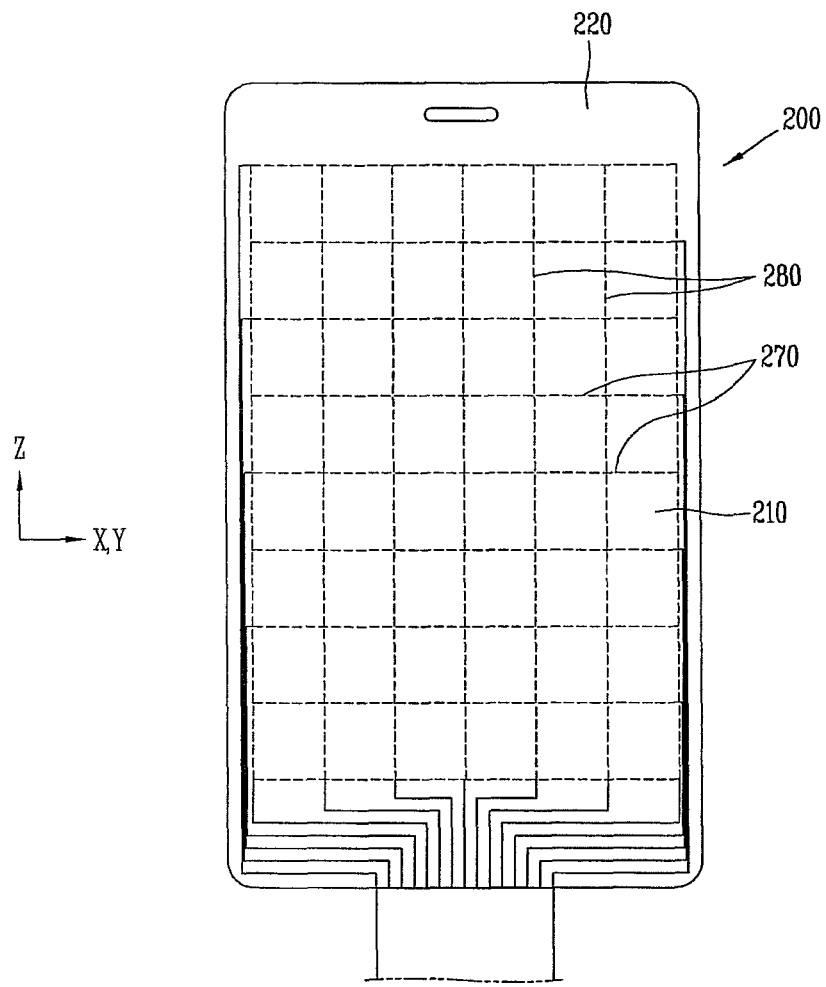
FIG. 12 is a planar view illustrating a touch window in accordance with this specification.

FIG. 12 is a planar view showing the touch window.

The window 200 may be applicable to the touch window. The touch window 200, as illustrated, may also have the transparent region 210 and the opaque region 220.

When a change of an electric signal is generated on a specific conductive line 270 of conductive lines 270 disposed in an X-axial direction and a change of an electric signal is generated on a specific conductive line 280 of conductive lines 280 disposed in a Y-axial direction, an intersection between the specific X-axial conductive line 270 and the specific Y-axial conductive line 280 may be detected as a touched position on the touch window 200.

Figure 13:
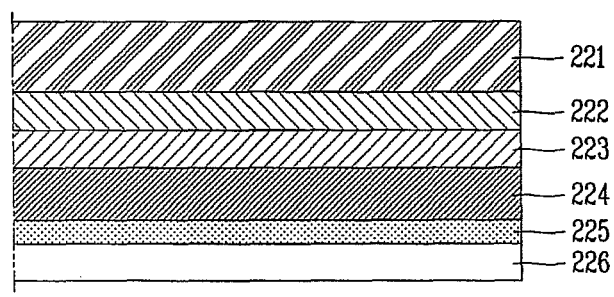
FIGS. 13 and 14 are sectional views illustrating a layer architecture of an opaque region of the touch window of FIG. 12.
Figure 14:
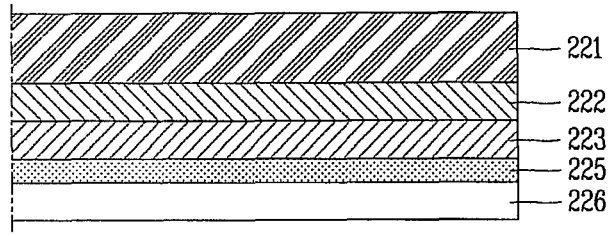

FIGS. 13 and 14 are sectional views showing layer architecture of the opaque region of the touch window.

In the exemplary embodiment of FIG. 13, the touch window 200 may include a substrate 221, a first layer 222, a second layer 223, a third layer 224, a fourth layer 225 and a fifth layer 226.

The third layer 224 may have a shielding function that it adsorbs incident light from the inside of the mobile terminal to prevent such internal light from being transmitted to the exterior, and be formed by bonding or adhering.

The first and second layers 222 and 223 are similar to the aforementioned. Here, the second layer 223 may preferably be made of a non-conductive material.

The third layer 224 may generally be formed with a gray or black color to improve a shielding effect.

Here, the second layer 223 may improve the shielding effect in cooperation with the third layer 224, and also prevent the color of the third layer 224 from being recognized from the exterior. Consequently, even when the first layer 222 has a bright color like a white color, it may be possible for a user to recognize the color without interference.

The fourth layer 225 may serve to adhere the substrate 221 having the first layer 222, the second layer 223 and the third layer 224 onto the fifth layer 226.

The fourth layer 225 may be made by using an optical adhesive film as a type of film, which is fabricated using Optically Clear Adhesive (OCA), or by directly coating an adhesive agent with high light transmittance. Alternatively, the fourth layer 225 may be provided in a state of an adhesive agent coated on a separate protection (passivation) film.

The fifth layer 226 may detect a touch input by means of the X-axial conductive lines 270 and the Y-axial conductive lines 280 provided on the Vietnam. The fifth layer 226 may be formed of Indium-Tin Oxide (ITO) so as to have transmittance.

This structure (architecture) may be effective for the touch window 200 when the first layer has a bright color. That is, the second layer 223 and the third layer 224 can effectively shield light generated in the mobile terminal 100 and the third layer 223 can minimize or prevent the color interference.

In the exemplary embodiment of FIG. 14, the touch window 200 may include the substrate 221, the first layer 222, the second layer 223, the fourth layer 225 and the fifth layer 226.

This exemplary embodiment illustrates a structure without the third layer 224.

This structure may be effective for the touch window 200 when the first layer 222 has a dark color. That is, for the dark color, the first layer 222 may not be sensitive to color interference and the second layer 223 may prevent the color interference. Consequently, without the third layer 224, the color of the first layer 222 may not seem to be discolored.

The foregoing description has given the structure that the first and second layers are formed on the window. The first and second layers may alternatively be formed on any portion, such as the front or rear case 101, 102, which configures the appearance of the mobile terminal.

Figure 15A:
FIG. 15 is a schematic view illustrating a fabricating process of a window in accordance with this specification.

FIG. 15 is a schematic view illustrating a fabricating process of a window in accordance with this specification.

As illustrated in FIG. 15, a substrate 221 which defines an overall outline of a window 200 may be prepared. The substrate 221 may be prepared by processing glass or plastic to have a specific thickness.

Figure 15B:

Next, a first layer 222 may be formed on the substrate 221 (see FIG. 15B). The first layer 222 may be formed on the aforesaid opaque region and have a single-layered structure or multi-layered structure. Deposition or printing may be used to form the first layer 222, and a masking process may be included.

When the first layer 222 is formed in the multi-layered structure, it may be formed such that its width can be gradually tapered in regard of the tolerance of a fabrication process.

Also, upon formation of the first layer 222, if the first layer 222 is formed on a region excluding a partial region with a preset shape (e.g., symbol, character, figure, logo, etc.), a second layer 223 to be formed later may be visible as it is, which may allow recognition of such shape like the logo without use of a separate logo sticker or the like.

Figure 15C:
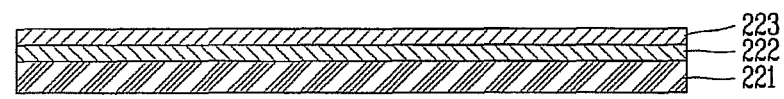

After formation of the first layer 222, a second layer 223 may be formed on the first layer 222 (see FIG. 15C). Deposition or printing may be used to form the second layer 223, and a masking process may be included.

In particular, the formation of the second layer 223 may be carried out by any of a thermal resistance evaporation, sputtering or Non-conductive Vacuum Metalizing (NCVM).

In accordance with this specification, the color sensitivity and clearness of a color on an opaque region of the window can be improved.

When a bright color is employed for the opaque region of the window, high color sensitivity and clearness can be maintained.

When a colored layer of the window is formed in a multi-layered structure and a stepped portion is present between the layers, it may be possible to prevent color difference.

Even when a shielding layer is formed on the window, the color sensitivity and clearness of a color on the opaque region of the window can be maintained.

The configurations and methods of the mobile terminal and the fabricating method may not be limitedly applied, but such embodiments may be configured by a selective combination of all or part of each embodiment so as to derive many variations.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
   a body to contain electronic components of the mobile terminal;
   a display provided on the body to provide images; and
   a window provided on the display, the window including a transparent region and an opaque region,
   wherein the opaque region of the window comprises:
      a transparent substrate,
      a first layer, at the opaque region of the window, formed on a surface of the transparent substrate, the first layer having a white color, wherein a width of the first layer having the white color is less than a width of the substrate,
      a second layer of high luminance formed on a surface of the first layer, the second layer of the opaque region provided between the first layer and the display, the second layer to reflect incoming light received through the first layer in a direction away from the display, and the second layer to reflect light received from the display in a direction away from the first layer such that the white color of the first layer is recognized, and a width of the second layer is less than a width of the first layer having the white color,
      a third layer formed under the second layer such that the third layer is between the second layer and the display, the third layer to adsorb light from the display, wherein the third layer is formed with a gray color or a black color, and
      a fourth layer and a fifth layer between the second layer and the display of the opaque region of the window, the fourth layer provided between the third layer and the fifth layer,
   wherein the second layer is formed of a non-conductive material,
   wherein the first layer includes an upper first layer and a lower first layer, the upper first layer is provided between the substrate and the lower first layer, and the lower first layer is provided between the upper first layer and the second layer,
   wherein the upper first layer and the lower first layer are formed such that a width from the transparent substrate to the second layer is gradually decreased, and
   wherein the upper first layer has a wider area than the lower first layer such that the first layer is provided as a stepped structure.

2. The mobile terminal of claim 1, wherein the second layer of the opaque region includes a first surface that faces the first layer and a second surface that faces the display, the first surface of the second layer reflects the incoming light received from the first layer in the direction away from the display, and the second surface of the second layer reflects the light received from the display in the direction away from the first layer.

3. The mobile terminal of claim 1, wherein the second layer is formed of one of indium, tin, or a combination of silicon oxide and titanium oxide.

4. The mobile terminal of claim 1, wherein the second layer is formed by one of thermal resistance evaporation, sputtering or Non-Conductive Vacuum Metalizing (NCVM).

5. The mobile terminal of claim 1, wherein the first layer includes a hole with a preset shape, the hole being in the opaque region between the transparent substrate and the second layer of the opaque region of the window.

6. The mobile terminal of claim 1, wherein the fourth layer adheres the substrate, the first layer, the second layer and the third layer onto the fifth layer.

7. The mobile terminal of claim 6, wherein the fourth layer comprises an optical adhesive film.

8. The mobile terminal of claim 6, wherein the fifth layer detects a touch input.

9. The mobile terminal of claim 1, wherein the opaque region is provided around a circumference of the transparent region.

10. A mobile terminal comprising:
  a wireless communication unit to provide wireless communication;
  a display to display images;
  a touch window on the display to receive touch inputs; and
  a body to support the wireless communication unit, the display and the touch window, wherein the touch window includes a transparent region and an opaque region, wherein the opaque region of the window includes:
    a transparent substrate,
    a first layer, in the opaque region of the window on the display, formed under the transparent substrate, the first layer having a white color,
    a second layer of high luminance formed under the first layer such that the first layer is provided between the second layer and the transparent substrate and the second layer is between the first layer and the display, the second layer including a first surface to face the first layer and a second surface to face away from the first layer, the first surface of the second layer to reflect external light away from the display, and the second surface of the second layer to reflect internal light away from the first layer such that the white color of the first layer is recognized, wherein an area of the second layer is at least as wide as an area of the first layer having the white color,
    a third layer formed under the second layer such that the third layer is between the second layer and the display, the third layer to adsorb light from the display, wherein the third layer is formed with a gray color or a black color, and
    a fourth layer and a fifth layer between the second layer and the display of the opaque region of the window, the fourth layer provided between the third layer and the fifth layer,
  wherein the second layer is formed of a non-conductive material,
  wherein the first layer includes an upper first layer and a lower first layer, the upper first layer is provided between the substrate and the lower first layer, and the lower first layer is provided between the upper first layer and the second layer,
  wherein the upper first layer and the lower first layer are formed such that a width from the transparent substrate to the second layer is gradually decreased, and
  wherein the upper first layer has a wider area than the lower first layer such that the first layer is provided as a stepped structure.

11. The mobile terminal of claim 10, wherein the second layer is formed of one of indium, tin, or a combination of silicon oxide and titanium oxide.

12. The mobile terminal of claim 10, wherein the fourth layer comprises an optical adhesive film.

13. The mobile terminal of claim 10, wherein the opaque region is provided around a circumference of the transparent region.

* * * * *